United States Patent
Elad et al.

(10) Patent No.: US 11,954,185 B2
(45) Date of Patent: Apr. 9, 2024

(54) METHODS, DEVICES, AND SYSTEMS FOR PREVENTING RENDERING CONTENT FROM CDN TO UNAUTHORIZED USERS

(71) Applicant: Synamedia Limited, Staines Upon Thames (GB)

(72) Inventors: Moshe Elad, Gedera (IL); David Livshits, Geva Binyamin (IL); Itai Ephraim Zilbershtein, Hod Hasharon (IL)

(73) Assignee: Synamedia Limited, Staines Upon Thames (GB)

( * ) Notice: Subject to any disclaimer, the term of this patent is extended or adjusted under 35 U.S.C. 154(b) by 239 days.

(21) Appl. No.: 17/701,828

(22) Filed: Mar. 23, 2022

(65) Prior Publication Data

US 2023/0306090 A1    Sep. 28, 2023

(51) Int. Cl.
*G06F 21/12* (2013.01)
*G06F 21/10* (2013.01)
*G06F 21/31* (2013.01)
*H04L 9/08* (2006.01)

(52) U.S. Cl.
CPC .......... *G06F 21/121* (2013.01); *G06F 21/105* (2013.01); *G06F 21/31* (2013.01); *H04L 9/0825* (2013.01); *H04L 9/0866* (2013.01)

(58) Field of Classification Search
CPC ...... G06F 21/121; G06F 21/105; G06F 21/31; H04L 9/0866; H04L 9/0825
USPC .......................................................... 726/27
See application file for complete search history.

(56) References Cited

U.S. PATENT DOCUMENTS

| | | | | |
|---|---|---|---|---|
| 8,931,105 B2 * | 1/2015 | Lipka | .................... | H04L 63/061 717/174 |
| 2003/0188154 A1 * | 10/2003 | Dallard | .............. | H04N 21/2225 713/153 |
| 2005/0187879 A1 * | 8/2005 | Zigmond | .............. | H04L 9/0825 705/59 |
| 2012/0331293 A1 * | 12/2012 | Ma | ..................... | H04N 21/4627 713/168 |
| 2013/0283051 A1 * | 10/2013 | Zigmond | .............. | H04L 9/0825 713/168 |
| 2016/0198202 A1 * | 7/2016 | Van Brandenburg | ....................... | H04N 21/2347 725/31 |
| 2016/0224799 A1 * | 8/2016 | Uzun | .................. | G06F 21/6227 |
| 2017/0346865 A1 * | 11/2017 | Hartman | .......... | H04N 21/25875 |

(Continued)

*Primary Examiner* — Samson B Lemma
(74) *Attorney, Agent, or Firm* — Fernando & Partners, LLP

(57) ABSTRACT

Techniques for preventing rendering content from content delivery network (CDN) to unauthorized users are described herein. In accordance with various embodiments, a CDN includes one or more processors and a non-transitory memory. The CDN receives a request from a client device for a media content item, where the request indicates an identifier of a client. The CDN further provisions an encrypted media content item corresponding to the media content item for the client, where at least a portion of the encrypted media content item is encrypted using at least one personalized key assigned to the client. The CDN also facilitates obtaining a manifest corresponding to the encrypted media content item, where the manifest specifies encryption metadata for retrieving the at least one personalized key by the client. The CDN additionally sends the encrypted media content item and the manifest to the client device.

19 Claims, 12 Drawing Sheets

(56) References Cited

U.S. PATENT DOCUMENTS

| | | | |
|---|---|---|---|
| 2019/0124377 A1* | 4/2019 | Chen | H04N 21/222 |
| 2020/0142750 A1* | 5/2020 | Kaplan | G06F 16/248 |
| 2020/0329019 A1* | 10/2020 | Watson | H04N 21/2351 |
| 2023/0132485 A1* | 5/2023 | Darshan | H04L 9/0894 |
| | | | 713/171 |

* cited by examiner

800

(A)

The portion of the encrypted media content item includes an instance of an encrypted segment encrypted with the at least one personalized key; and provisioning the encrypted media content item corresponding to the media content item for the client includes: (a) deriving an instance identifier from the identifier of the client; and (b) selecting the instance of the encrypted segment from multiple instances of the encrypted segment based on the instance identifier, where each of the multiple instances is encrypted using a different personalized key ⎯ 860

The encrypted media content item includes encrypted segments protected with a content key corresponding to the media content item, and the method further includes: (a) receiving the encrypted segments and the multiple instances of the encrypted segment from a headend; and (b) storing the encrypted segments and the multiple instances of the encrypted segment ⎯ 862

The encrypted segments are generated by the headend during a global content encryption period using the content key; the multiple instances of the encrypted segment are generated by the headend during a personalized content preparation period using multiple personalized keys; and the encrypted segments are interleaved with the instance of the encrypted segment in the encrypted media content item ⎯ 864

(B)

The portion of the encrypted media content item corresponds to the encrypted media content item; and provisioning the encrypted media content item corresponding to the media content item for the client includes: (a) receiving the media content item in an unencrypted format from a headend; and (b) obtaining the at least one personalized key corresponding to the identifier of the client and encrypting the media content item using the at least one personalized key to generate the encrypted media content item in response to receiving the request from the client ⎯ 870

The the encrypted media content item includes the portion of the encrypted media content protected with the at least one personalized key and encrypted segments protected with a content key corresponding to the media content item; and provisioning the encrypted media content item corresponding to the media content item for the client includes: (a) receiving the encrypted segments and an unencrypted portion of the media content item from a headend, where the encrypted segments and the unencrypted portion are interleaved; and (b) obtaining the at least one personalized key corresponding to the identifier of the client and encrypting the unencrypted portion using the at least one personalized key to generate the portion of the encrypted media content item in response to receiving the request from the client

— 880

Provisioning the encrypted media content item corresponding to the media content item for the client includes: (a) receiving encrypted segments protected with a content key corresponding to the media content item from a headend; and (b) modifying at least one of the encrypted segments or the encryption metadata associated with the content key in response to receiving the request from the client

— 890

Modifying at least one of the encrypted segments or the encryption metadata associated with the content key in response to receiving the request from the client includes: (a) obtaining the at least one personalized key corresponding to the identifier of the client; and (b) encrypting, using the at least one personalized key, at least one of the encrypted segments or the encryption metadata associated with the content key in response to receiving the request from the client

— 892

Sending the encrypted media content item and the manifest to the client device causes the client device to: derive the encrypted segments and the encryption metadata, including decrypting the encrypted segments or the encryption metadata associated with the content key using the at least one personalized key

METHODS, DEVICES, AND SYSTEMS FOR PREVENTING RENDERING CONTENT FROM CDN TO UNAUTHORIZED USERS

TECHNICAL FIELD

The present disclosure relates generally to security in multimedia content delivery and, more specifically, to preventing rendering content to unauthorized users.

BACKGROUND

Content and service providers typically require protection for over-the-top (OTT) streaming content such as using a secret key (also known as a content encryption key or a content key in many DRM systems) to encrypt the content under digital rights management (DRM). DRM protection is often performed as part of OTT content preparation. A data plane encodes, packages, and encrypts clear content, and then makes the encrypted content available for clients to fetch. On the client side, each client fetches the DRM-protected content using protocol requests, e.g., HTTP protocol requests. To facilitate the fetching, e.g., in response to the request or prior to the client request, packager(s) packages the encoded and encrypted content an Adaptive Bit Rate (ABR) content format (e.g., HLS, DASH, or other suitable formats) and prepares a manifest that specifies locations of content segments for fetching. When fetching the content, the client reads the signaling that specifies whether the content is encrypted, which key is required for decryption, and what DRM system can be used to get the license from. Based on the signaling information, the client requests a DRM license from a DRM plane and plays the protected content. As such, authorized users/devices can consume the encrypted content by acquiring a DRM license associated with the secret key and using the secret key to decrypt the content, and then render the decrypted content.

The basic assumption behind DRM protection is that the secret key can be kept secure. As such, the content is secure when the secret key is secure. However, content key sharing is a widespread problem in OTT streaming Vulnerabilities in popular DRM systems allow many pirate scripts to extract and share the content key. Once the content encryption key is compromised and shared, pirate users can stream content directly from the service provider's content delivery network (CDN) and decrypt the encrypted content using various utilities and players, many of which are open sourced. Moreover, once the secret key is compromised and shared, unauthorized users can access the CDN using their own applications and consume the content. Not only that the service provider does not derive revenue from the unauthorized content consumption, but it also incurs charges by the CDN provider for the additional traffic.

For secure DRM protection, one naïve approach is to encrypt each playback session using a unique key. However, such an approach would not be scalable for systems with millions of users. It is not scalable in at least two dimensions: 1) the encryption processing that is required for each session; and 2) the CDN storage and caching capabilities that assume maximum commonality between content of different users.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 8A-8C are flow diagrams illustrating a method for preventing rendering content from content delivery network (CDN) to unauthorized users, in accordance with some embodiments.

Figure 1A:
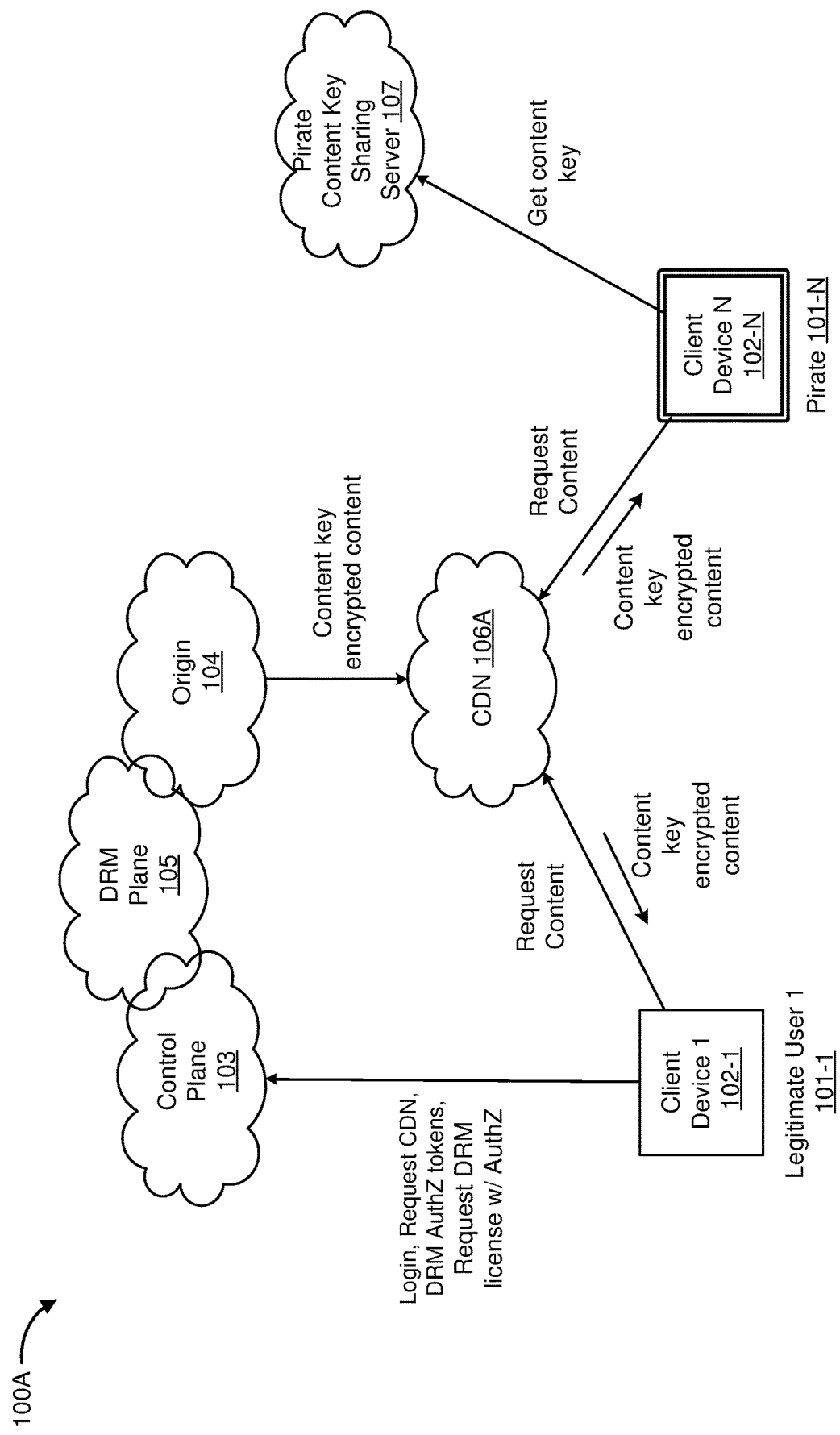
FIG. 1A is a block diagram of an exemplary over-the-top (OTT) content delivery system that uses a content key for digital rights management (DRM) protection, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

An adaptive and scalable solution in accordance with various embodiments described herein enables personalized over-the-top (OTT) content protection such that even if a content key is leaked and shared, the content key sharing is not sufficient for unauthorized users (e.g., pirates) to decrypt and render the content from a content delivery network (CDN). In some embodiments, rather than encrypting the entire media content item with separate keys for each user as in some previously existing solutions, parts of the media content item are encrypted using personalized keys to keep the packaging overhead within controllable limits. By keeping the processing and storage cost within certain limits, the solution described herein is adaptive and scalable. In some embodiments, depending on the CDN storage cost, the personalized content protection can be configured per content or per end-user at any time during content consumption to prevent delivering content from CDN to unauthorized users.

In accordance with various embodiments, a method for preventing rendering content from CDN to unauthorized users is performed at a content delivery network (CDN) including one or more processors and a non-transitory memory. The method includes receiving a request from a client device for a media content item, where the request indicates an identifier of a client. The method further includes provisioning an encrypted media content item corresponding to the media content item for the client, where at least a portion of the encrypted media content item is encrypted using at least one personalized key assigned to the client. The method also includes facilitating obtaining a manifest corresponding to the encrypted media content item, where the manifest specifies encryption metadata for retrieving the at least one personalized key by the client. The method additional includes sending the encrypted media content item and the manifest to the client device.

Example Embodiments

As explained above, over-the-top (OTT) content delivery systems sometimes use digital rights management (DRM) protection, where a secret key (also known as a content encryption key or a content key) is used for content encryption. For example, FIG. 1A is a diagram 100A illustrating an exemplary OTT content delivery system 100A that uses a content key for DRM protection. In FIG. 1A, an origin server 104 provides a media content item that is encrypted using a content key. In the exemplary OTT streaming system 100A, a content delivery network (CDN) 106A obtains the encrypted media content items from the original server 104 and provides resource services. Also in the exemplary OTT streaming system 100A, a control plane 103 authenticates users. For instance, legitimate user 1 101-1 uses client device 1 102-1 to login to the control plane 103 and request tokens from the control plane 103.

In some embodiments, the control plane 103 is a server that performs multiple tasks, such as login authentication, authorization, and/or providing resources. During the login phase, the control plane 103 authenticates legitimate user 1 101-1 based on the information received from client device 1 102-1. Upon authenticating legitimate user 1 101-1, the control plane 103 sends to client device 1 102-1 authorization tokens for CDN access. Client device 1 102-1 can then use the CDN authorization token to request content and access media on the CDN 106A. In some embodiments, the exemplary OTT streaming 100A also includes a DRM plane 105 for generating and maintaining DRM licenses and keys. In some embodiments, for access to resources, the control plane 103 sends to client device 1 102-1 digital rights management (DRM) licenses, etc. obtained from the DRM plane 105. In the case of the media content being protected with DRM, client device 1 102-1 uses a DRM authorization token obtained from the control plane 103 as part of a license request to get specific DRM license(s) for decryption.

In the exemplary system 100A, when legitimate user 1 101-1 at client device 1 102-1 requests a media content item from the CDN 106A, e.g., by sending an identifier corresponding to the media content item along with authorization tokens, the CDN 106A provides the requested media content item to client device 1 102-1, where the media content item is encrypted using the content key by the origin server 104. Upon receiving the content key encrypted media content item, client device 1 102-1 uses the DRM authorization token to request a DRM license from the DRM plane 105, obtains the content key from the DRM license for decrypting the encrypted media content item, and plays the decrypted media content item.

Also in the exemplary system 100A, a pirate 101-N at client device N 102-N may obtain the content key from a pirate content key sharing server 107, wherein the pirate content key sharing server 107 exploits vulnerabilities in the system 100A and extracts the content key to share with the pirate 101-N. When the pirate 101-N requests the same media content item from the CDN 106A, the pirate 101-N obtains the content key encrypted media content item from the CDN 106A and uses the content key from the pirate content key sharing server 107 to decrypt the encrypted media content item for consumption. As such, once the content key is compromised and shared by the pirate content key sharing server 107, media content items in the exemplary system 100A are no longer protected by DRM.

Methods, devices, and systems in accordance with various embodiments described herein enhance security for content preparation and consumption to solve the aforementioned issues in previously existing OTT content delivery systems. In some embodiments, instead of relying on a single content key for protection, parts of a media content item are encrypted with personalized keys in a way that prevents theft of a single key (or even a pair of keys) without incurring the full overhead of uniquely encrypting 100% of the media content item for each subscriber.

Figure 1B:
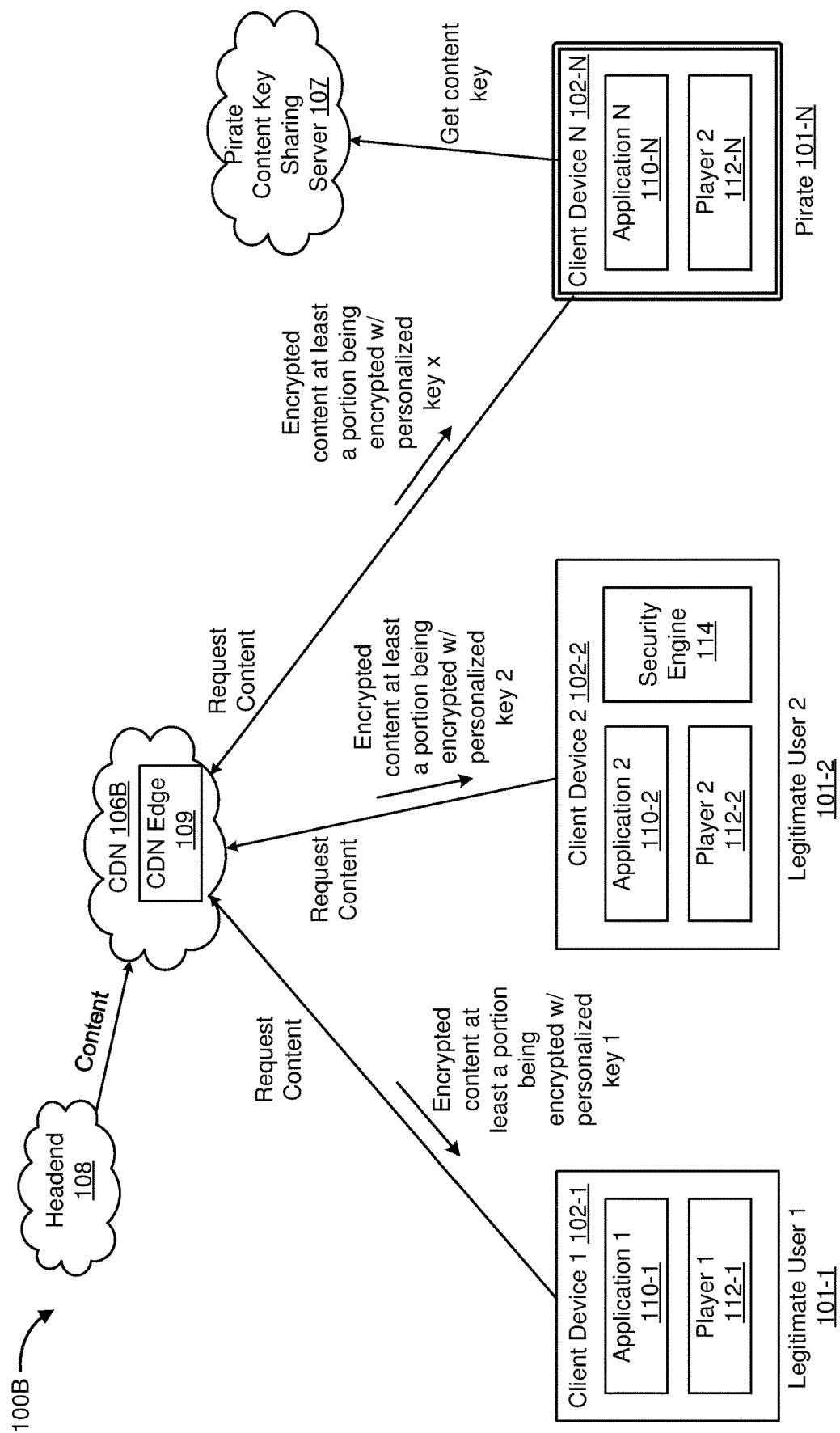
FIG. 1B is a block diagram of an exemplary OTT content delivery system that uses personalized key(s) in addition to the content key for DRM protection, in accordance with some embodiments.

FIG. 1B is a diagram illustrating an exemplary OTT content delivery system 100B that uses personalized key(s) for DRM protection in addition to the content key in accordance with some embodiments. In the exemplary OTT content delivery system 100B, a CDN 106B received the content from a headend 108. In some embodiments, the headend 108 includes an encoder for encoding the content and/or an encryptor for encrypting the content if necessary. Once encoded and/or encrypted, the encoder uploads the content to an origin server in the headend 108 for further distribution to the CDN 106B.

In some embodiments, the CDN 106B includes a CDN edge 109 to facilitate the encryption of the media content, such that at least a portion of a media content item delivered by the CDN 106B is encrypted using a personalized key assigned to a client, e.g., at least a portion of the content delivered to client device 1 102-1 used by legitimate user 1 101-1 is encrypted with personalized key 1, at least a portion of the content delivered to client device 2 102-2 used by legitimate users 2 101-2 is encrypted with personalized key 2, etc. As such, even if the content key is compromised, e.g., extracted by the pirate content key sharing server 107 and shared with client device N 102-N used by pirate 101-N, when the pirate 101-N requests content from the CDN 106B, because at least a portion of the content is protected with personalized key x, the pirate 101-N at client device N 102-N would not be able to the decrypt the entire content using only the content key.

Also as shown in FIG. 1B, in some embodiments, client device 1 102-1 used by legitimate user 1 101-1 includes application 1 110-1 for obtaining authentication, authorization, and/or content, e.g., interacting with the control plane, the DRM plane, and/or the CDN 106B. Further, client device 1 102-1 includes player 1 112-1 (e.g., a native DRM player) coupled to application 1 110-1 for playing the content, e.g., obtaining the DRM license and the encrypted content from application 1 110-1, decrypting the content using the key in the DRM license, and rendering the decrypted content. In such embodiments, the exemplary content delivery system 100B allows content protection without modifying media players on the client side. Additionally as shown in FIG. 1B, in some embodiments, in addition to application 2 110-2 and player 2 112-2 (e.g., a native DRM player for playing the content), client device 2 102-2 used by legitimate user 2 101-2 includes a security engine 114 for obtaining the personalized key, e.g., interacting with the control plane and/or the DRM plane for obtaining the personalized keys based on personalized tokens. In such embodiments, the exemplary content delivery system 100B provides additional layer(s) of encryption for client devices with the security engine 114.

Figure 2:
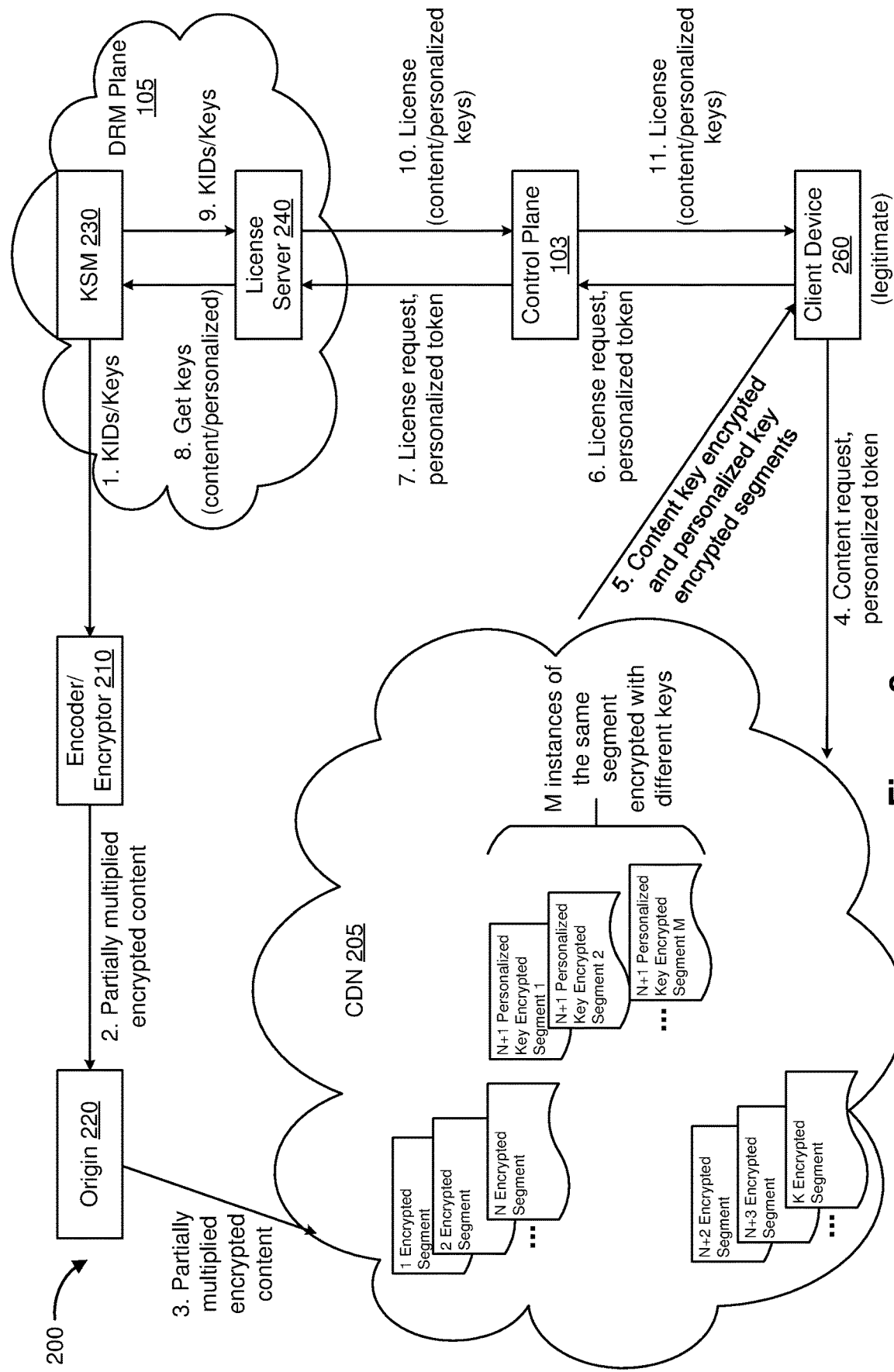
FIGS. 2-4 are diagrams illustrating various embodiments of the exemplary OTT content delivery system that uses personalized keys for DRM protection and follows the standard DRM approaches for content consumption, license flow, and content playback, in accordance with some embodiments.
Figure 3:
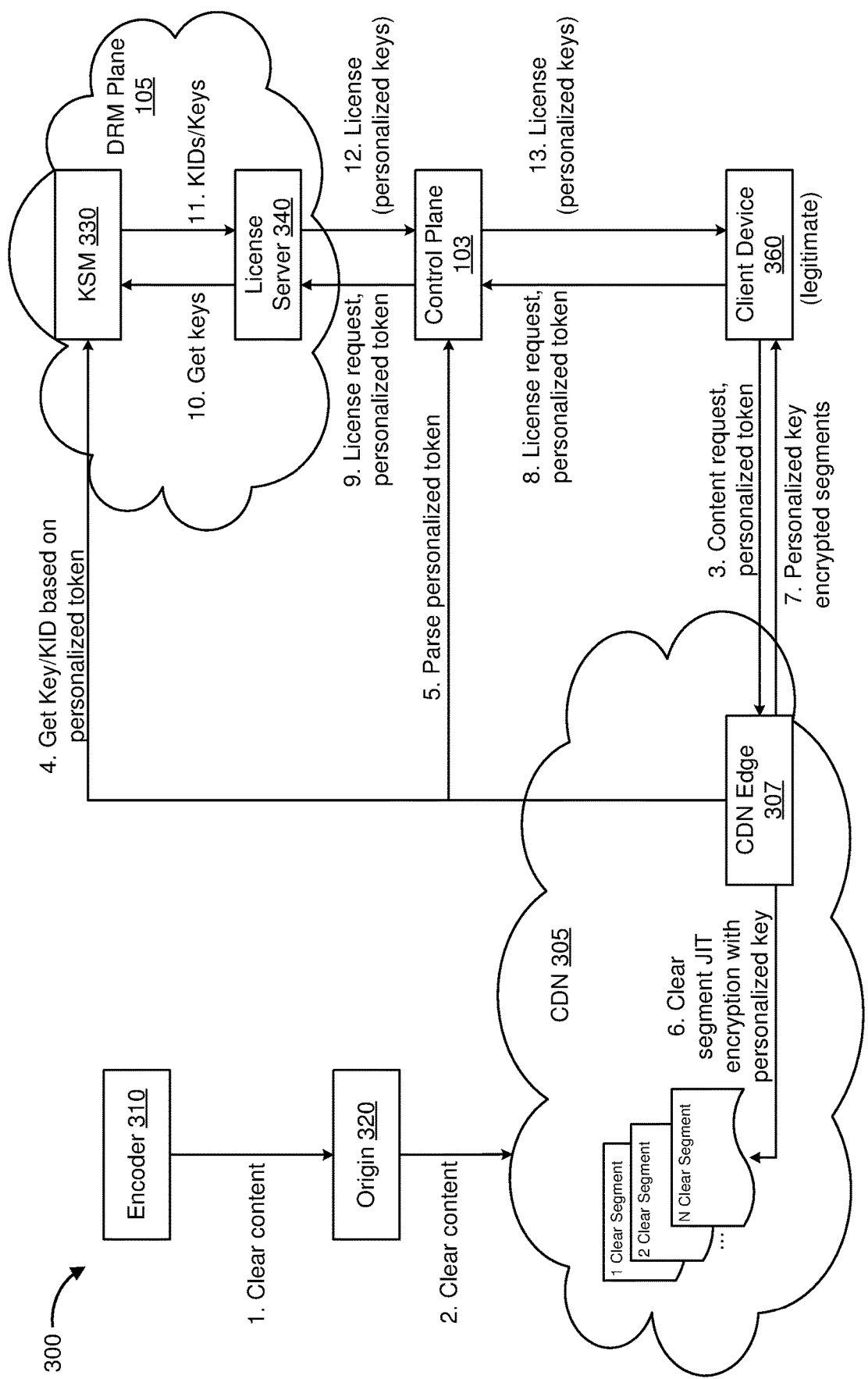
Figure 4:
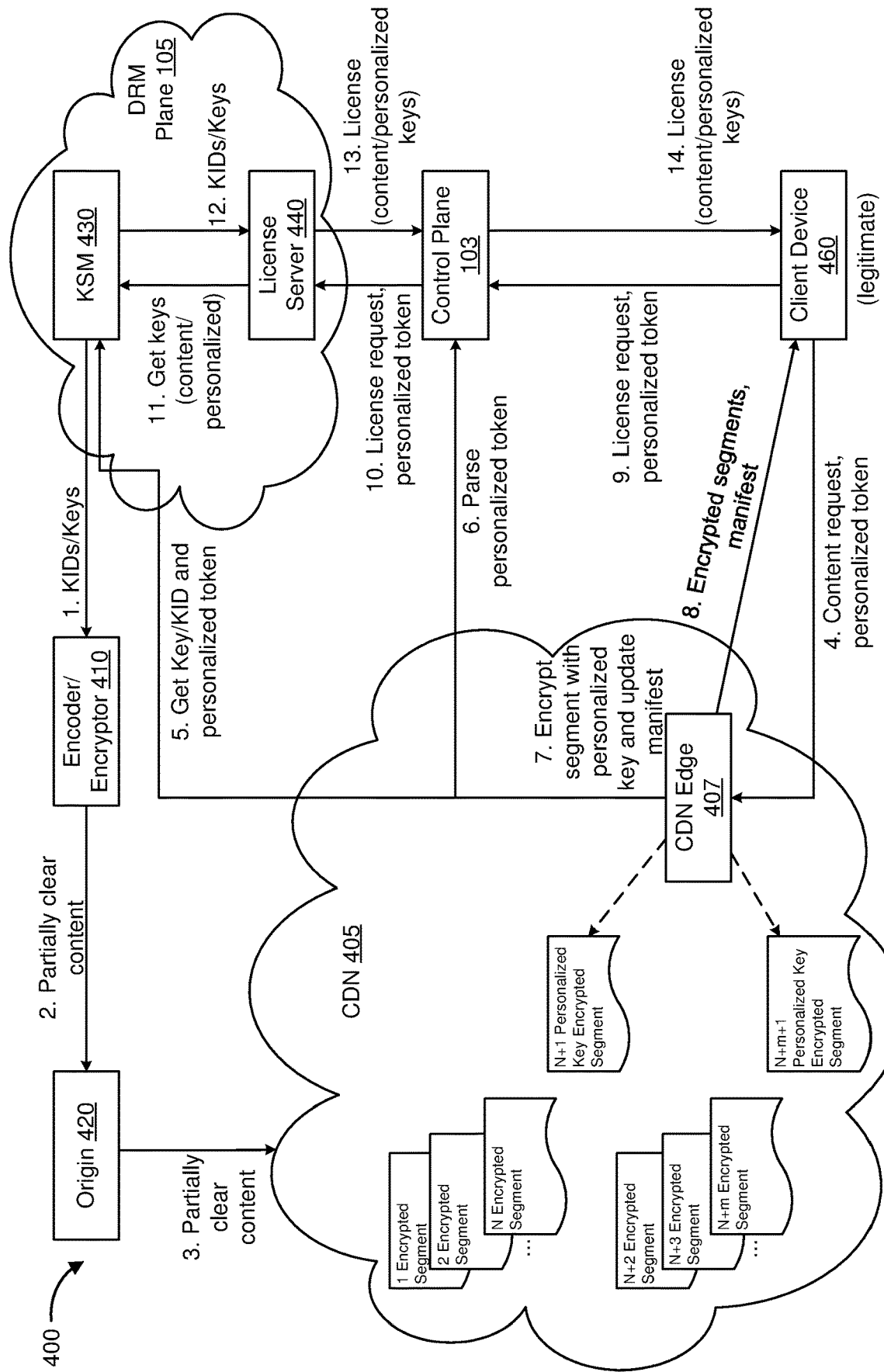

Relative to the exemplary system 100A, the system 100B enhances DRM protection by controlling access to content from the CDN personalized for each media content item and each client. For legitimate users 101-1 and 101-2, using the personalized keys, client device 1 102-1 and client device 2 102-2 can decrypt each media content item for consumption. On the other hand, because the pirate 101-N does not have the personalized key for decrypting the portion of the media content item protected with the personalized key, the pirate cannot decrypt the entire media content item for consumption. In some embodiments, instead of sending content to client device N 102-N used by the pirate 101-N as shown in FIG. 1B, the CDN 106B denies the content request and/or does not provision the content for the client when a personalized token is not appended to the content request or when an invalid personalized token is appended to the content request, e.g., when the pirates 101-N clones the authorization token from client device 1 102-1 or client device 2 102-2 by observing the authorization tokens in open platforms. Accordingly, relative to the exemplary system 100A, the exemplary system 100B is more secure for countering content key sharing in OTT content delivery systems. FIGS. 2-4 are various embodiments of the exemplary system 100B that prevent rendering content from CDN to unauthorized users and follow the standard DRM approaches for content consumption, license flow, and content playback.

FIG. 2 is a diagram illustrating an exemplary OTT media content delivery system 200 that stores partially multiplied encrypted content on CDN in accordance with some embodiments. In some embodiments, the exemplary system 200 includes an encoder and encryptor 210 coupled with an origin server 220 and a key security module (KSM) 230. The encoder and encryptor 210 obtains keys and/or key identifiers (KIDs) from the KSM 230 in step 1 and produces encoded and encrypted content that is mostly encrypted with a content key except for small parts that are further processed for personalized content delivery. In some embodiments, the minimal processing unit by the encoder and encryptor 210 in terms of encryption is a sample, where a sample is encrypted using a single content key. In some embodiments, the minimal storage unit on a CDN 205 is a segment or a subsegment, e.g., the minimal addressable piece of content that a client device 260 can request.

During the content preparation stage, the encoder and encryptor 210 prepares the content during a global content encryption period (also referred to hereinafter as a global content preparation period or a global period), followed by a personalized content encryption period (also referred to hereinafter as a personalized content preparation period or a personalized period). During the personalized content encryption period, the encoder and encryptor 210 prepares multiple variants of the portion of the content, e.g., the small part of the content has multiple instances, and each instance is encrypted with a different personalized key. The encoder and encryptor 210 then sends the partially multiplied encrypted content to the origin 220 for further distribution to the CDN 205 in steps 2 and 3, respectively. It should be noted that in the case of video-on-demand content, the system often uses one personalized key and one content key, whereas in the case of linear content, the personalized key and the content key are rotated over time. As such, during the content preparation stage, the encoder and encryptor 210 can apply one or more keys for encryption. There is no dependency between rotation of the content key and the rotation of the personalized key.

For example, in FIG. 2, during a first global content encryption period, the encoder and encryptor 210 obtains a content key corresponding to the media content item from the KSM 230 and encrypts segments 1 through N of a media content item using the content key. Subsequently, during a personalized content encryption period, the encoder and encryptor 210 obtains M personalized keys from the KSM 230 and prepares M instances of segment N+1, where each of the M instances of segment N+1 is generated by encrypting segment N+1 using one of the M personalized keys. Having prepared the M instances of segment N+1, during the next global content encryption period, the encoder and encryptor 210 encrypts segments N+2 through K using the content key corresponding to the media content item. The partially multiplied encrypted content is then distributed to the CDN 205 via the origin 220 and stored on the CDN 205.

In some embodiments, the ratio between the number of segments encrypted with the content key and the number of segments encrypted during the personalized encryption period (e.g., 10% of the content is encrypted with personalized keys) depends on various factors, such as the CDN price, security criteria, processing and/or storage cost, etc. Further, in terms of content packaging, any standard adaptive bitrate technology and/or standard encryption scheme can be applied. The key separation between the content key and the personalized key is at the segment level and signaled via different KIDs in compliance with any adaptive bitrate (ABR) technology. Additionally, the content can be uploaded to the origin server 220 and then to the CDN 205 using any pull/push approach for content upload.

When a legitimate user at the client device 260 requests the content from the CDN 205 in step 4, the request includes a personalized token that is unique and identifies the client. Upon receiving the content, the CDN 205 parses the personalized token and provisions to the client the content key encrypted segments together with an instance of the personalized key encrypted segment, which is selected based on the personalized token, and sends the content encrypted interleaved with the content key and the personalized key to the client device 260 in step 5.

Once the client device 260 receives the segments with the interleaved encryption keys, the client device requests a DRM license from the control plane 103 and appends the same personalized token to the request in step 6 in accordance with some embodiments. In some embodiments, the control plane 103, upon receiving the license request, forwards the license request to a license server 240 in step 7. In response to receiving the license request, the license server 240 sends a request to the KSM 230 for keys in step 8, e.g., requesting both the content key and the personalized key. The KSM 230 retrieves the keys and the corresponding KIDs based on the information from the request and sends to the license server 240 in step 9. The license server 240 packages the keys in a license and returns the license to the client device 260 via the control plane 103 and signaled with different KIDs in compliance with any standard native DRM in steps 10 and 11, respectively. The client device 260 can then decrypt the content using both the content key and the personalized key in the license and render the decrypted content for consumption by the legitimate user.

For example, during content preparation stage, in the case of using m bits of an identifier associated with each client for assigning a personalized key, e.g., m bits of a session ID of a session playing the content, a device ID of the client device 260 for consuming the content, and/or a user ID of a user, during the personalized period, the encoder and encryptor 210 prepares $2^m$ variants of segment N+1 and the CDN 205 then stores the partially multiplied encrypted content. During playback, the client device 260 requests and obtains from the CDN 205 a variant corresponding to m bits of its identifier (e.g., a session ID of a session playing the content, a device ID of the client device 260 for consuming the content, and/or a user ID of a user). The client device then obtains from the control plane 103, the license server 240, and/or the KSM the license allowing the client device 260 to consume both the portion encrypted with the content key and the variant, e.g., the portion encrypted with the personalized key. The upper limit of processing and storage overhead can be calculated as $(P \times 2^m)/G \times 100$ where P is the personalized content encryption period and G is the global content encryption period, in accordance with some embodiments. For instance, when P is 2 sec, G is 128 sec, and m is 6 bits, the encoder and encryptor 210 generates 64 variants, and the processing and storage overhead is approximately $(2 \times 2^6)/128 \times 100 = 100\%$, e.g., doubling the encryption processing and storage.

As shown in FIG. 2, in the case of the content key being compromised, sharing the content key alone is not enough to decrypt the entire content, because at least a portion of the content (e.g., an instance of segment N+1) is encrypted with a personalized key. In the case of the personalized token from the client device 260 being stolen and shared with a pirate, because the token typically has a short time-to-live (TTL) attribute, when the personalized token is renewed upon expiration, the content consumption by the pirate would be disrupted.

FIG. 3 is a diagram illustrating an exemplary OTT media content delivery system 300 that performs just-in-time (JIT) content encryption using personalized keys on CDN edge in accordance with some embodiments. In some embodiments, the exemplary system 300 includes an encoder 310 coupled with an origin server 320. The encoder 310 uploads clear content (e.g., encoded but unencrypted content) to the origin server 320 and then to a CDN 305 using any pull/push approach for content upload in steps 1 and 2, respectively. The CDN 305 then stores the clear segments, e.g., storing clear segment 1, clear segment 2, ..., clear segment N on the CDN 305.

When a legitimate user at a client device 360 requests the content from a CDN edge 307 in step 3, the client device 360 appends to the request a personalized token that is unique and identifies the client. The CDN edge 307, after receiving the content request, parses the personalized token and sends a request to a KSM 330 for a personalized key and the KID corresponding to the information in the personalized token in step 4. In some embodiments, in response to receiving the request from the client device 360, in step 5, the CDN edge 307 sends the personalized token to the control plane 103 for parsing and sends the parsed client information to the KSM 330 for the corresponding personalized key and KID. In step 6, the CDN edge 307 then uses the personalized key and KID from the KSM 330 for encrypting the clear segments from the origin server 320. As such, the CDN edge 307 provisions to the client device 360 personalized encrypted segments that are encrypted just-in-time (JIT) with the personalized key received from KSM 330 that correspond to the personalized token. In some embodiments, the CDN edge 307 also patches the ABR manifest with encryption metadata or adds the encryption metadata during the manifest generation stage. In terms of content packaging, any standard ABR technology and standard encryption scheme can be applied.

In step 7, the CDN edge 307 sends the provisioned encrypted content to the client device 360. Once the client device 360 receives the content encrypted with the personalized key, the client device 360 requests the license from the control plane 103 in step 8 and appends the personalized token to the request. In some embodiments, the control plane 103, upon receiving the license request, forwards the license request to a license server 340 in step 9. In response to receiving the license request, the license server 340 sends a request to the KSM 330 for keys in step 10, e.g., requesting the personalized key. The KSM 330 retrieves the personalized key and the corresponding KIDs based on the information from the request and sends to the license server 340 in step 11. The license server 340 packages the personalized key in a license and returns the license to the client device 360 via the control plane 103 and signaled with different KIDs in compliance with any standard native DRM in steps 12 and 13, respectively. The client device 360 can then decrypt the content using the personalized key in the license and render the decrypted content for consumption by the legitimate user.

In the exemplary system 300, the personalized key and KID, which are used by the CDN edge 307 to encrypt the content, are also used by the license server 340 to generate the license for an authorized requesting client device. Relative to the embodiments shown in the exemplary system 200, the content is encrypted JIT by the CDN edge 307 with a personalized key, thus reducing the storage cost for content duplication on the CDN 305. Further, because the content is provisioned at the CDN edge 307 and encrypted with the personalized key, there is no content key that can be exposed and shared. In the case of the personalized key being exposed and shared with the pirate, e.g., by stealing the personalized token from the client device 360, because the token typically has a short TTL attribute, when the personalized token is renewed upon expiration, the content consumption by the pirate would be disrupted.

FIG. 4 is a diagram illustrating an exemplary OTT media content delivery system 400 that performs partial JIT encryption by CDN edge in accordance with some embodiments. In some embodiments, the exemplary system 400 includes an encoder and encryptor 410 coupled with an origin server 420 and a KSM 430. The encoder and encryptor 410 obtains keys and/or key identifiers (KIDs) from the KSM 430 in step 1 and produces partially clear content, e.g., a portion of the content encoded but unencrypted including encrypted segment 1, encrypted segment 2, ..., encrypted segment N, encrypted segment N+2, encrypted segment N+3, ..., encrypted segment N+m, etc. and another portion of the content encoded and encrypted content including clear segment N+1, clear segment N+m+1, etc., where the encoded and encrypted portion is encrypted with a content key. The encoder and encryptor 410 then uploads the partially clear content to the origin server 420 and then to a CDN 405 using any pull/push approach for content upload in steps 2 and 3, respectively. The CDN 405 then stores the encoded and encrypted segments, e.g., storing encrypted segment 1, encrypted segment 2, . . . , encrypted segment N on the CDN 405.

When a legitimate user at a client device 460 requests the content from a CDN edge 407 in step 4, the client device 460 appends to the request a personalized token that is unique and identifies the client. The CDN edge 407, after receiving the content request, parses the personalized token and sends a request to a KSM 430 for a personalized key and KIDs corresponding to the information in the personalized token in step 5. In some embodiments, in response to receiving the request from the client device 460, in step 6, the CDN edge 407 sends the personalized token to the control plane 103 for parsing and sends the parsed client information to the KSM 430 for the corresponding personalized key and KID. In step 7, the CDN edge 407 uses the personalized key and KID from the KSM 430 for encrypting the unencrypted portion from the origin server 420, e.g., encrypting clear segment N+1 and clear segment N+m+1 using the personalized key. As such, the CDN edge 407 provisions to the client device 360 the segments encrypted with the content key, e.g., encrypted segment 1, encrypted segment 2, . . . , encrypted segment N, encrypted segment N+2, encrypted segment N+3, . . . , encrypted segment N+m, etc., as well as the segments encrypted with the personalized key received from KSM 330 that correspond to the personalized token, e.g., encrypted segment N+1 and encrypted segment N+m+1, etc. In some embodiments, the CDN edge 407 also patches the ABR manifest with encryption metadata or adds the encryption metadata during the manifest generation stage. In terms of content packaging, any standard ABR technology and standard encryption scheme can be applied.

In step 8, the CDN edge 407 sends the provisioned encrypted content to the client device 460. Once the client device 460 receives the encrypted content and the manifest, the client device 460 requests the license from the control plane 103 in step 9 and appends the personalized token to the request. In some embodiments, the control plane 103, upon receiving the license request, forwards the license request to a license server 440 in step 10. In response to receiving the license request, the license server 440 sends a request to the KSM 430 for keys in step 11, e.g., requesting both the content key and the personalized key. The KSM 430 retrieves the keys and the corresponding KIDs based on the information from the request and sends to the license server 440 in step 12. The license server 440 packages the keys in a license and returns the license to the client device 460 via the control plane 103 and signaled with different KIDs in compliance with any standard native DRM in steps 13 and 14, respectively. The client device 460 can then decrypt the content using the content key and the personalized key in the license and render the decrypted content for consumption by the legitimate user.

In the exemplary system 400, the personalized key and KID, which are used by the CDN edge 405 to encrypt the content, are also used by the license server 440 to generate the license for an authorized requesting client device. Relative to the embodiments shown in the exemplary system 200, the CDN 405 does not store multiple instances of the same segment, thus saving the storage cost on the CDN 405. Relative to the embodiments shown in the exemplary system 300, a portion of the content is encrypted JIT by the CDN edge 407 with a personalized key, thus reducing the processing cost for the CDN edge 407. In the case of the content key being compromised, it is not enough to share just the content key for decrypting the entire content, because at least a portion of the content (e.g., segment N+1 and segment N+m+1) is encrypted with a personalized key. In the case of the personalized key being exposed and shared with the pirate, e.g., by stealing the personalized token from the client device 460, because the token typically has a short TTL attribute, when the personalized token is renewed upon expiration, the content consumption by the pirate would be disrupted.

Figure 5:
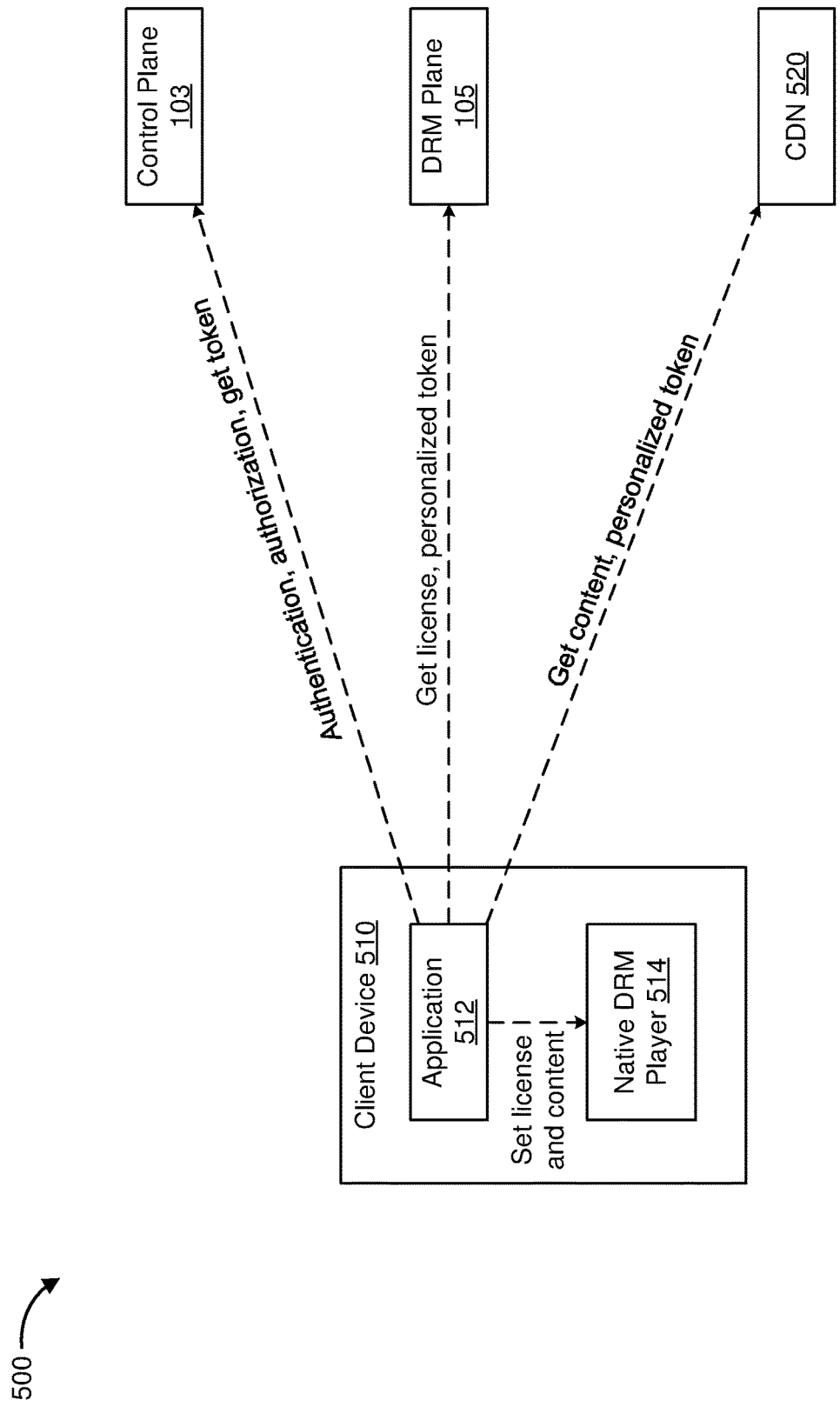
FIG. 5 is a diagram illustrating an exemplary client device used in various exemplary OTT content delivery systems that use more than one key for DRM protection, in accordance with some embodiments.

FIG. 5 is a block diagram 500 illustrating an exemplary client device 510 used in various exemplary OTT content delivery systems 100B and 200-400 (FIGS. 1B and 2-4) in accordance with some embodiments. In some embodiments, the various exemplary OTT content delivery systems 100B and 200-400 include a client device 510, the control plane 103 as described above with reference to FIGS. 1A and 2-4, the DRM plane 105 as described above with reference to FIGS. 1A and 2-4, and a CDN 520. In some embodiments, the client device 510 corresponds to client device 1 102-1 (FIG. 1B), the client device 260 (FIG. 2), the client device 360 (FIG. 3), or the client device 460 (FIG. 4). In some embodiments, the CDN 520 corresponds to the CDN 106B (FIG. 1B), the CDN 205 (FIG. 2), the CDN 305 (FIG. 3), or the CDN 405 (FIG. 4).

As shown in FIG. 5, for content authorization, license flow, and content playback, the embodiments described above with reference to FIGS. 2-4 are in compliance with the native DRM approaches. The client device 510 includes an application 512 coupled with a native DRM player 514 in accordance with some embodiments. The application 512 interacts with the control plane 103 to obtain authentication, authorization, and tokens, interacts with the DRM plane 105 to request DRM licenses and attaches to the license request the personalized token obtained from the control plane 103, and interacts with the CDN 520 to request content and attaches to the content request the personalized token obtained from the control plane 103. Upon obtaining the DRM licenses and the encrypted content, the application 512 instructs the native DRM player 514 to decrypt the content using the key(s) in the DRM license and render the decrypted content. As such, the client device 510 does not require additional components for content playback.

Figure 6:
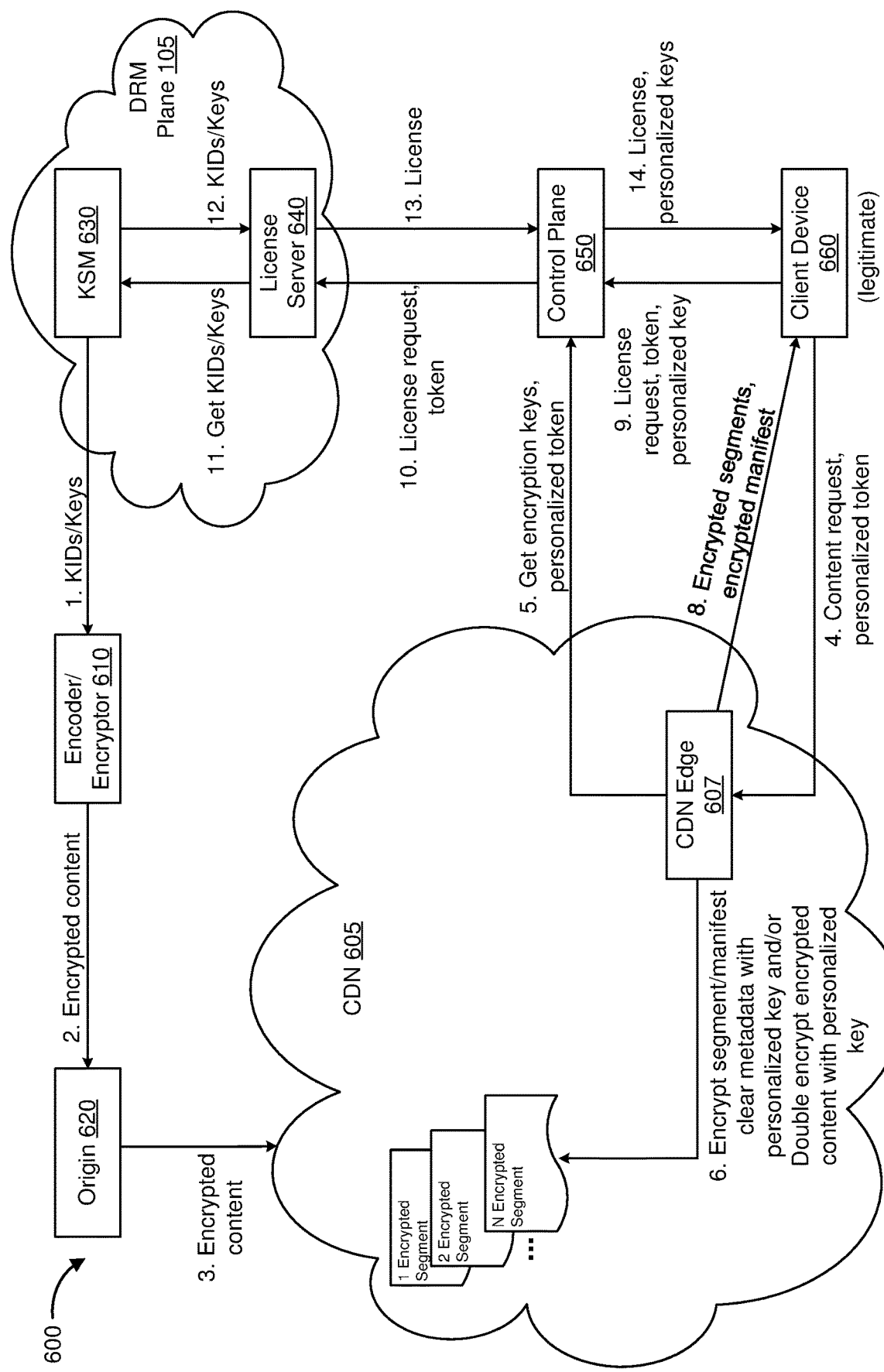
FIG. 6 is a diagram illustrating an exemplary OTT content delivery system that uses personalized keys for additional protection without following the standard DRM flows, in accordance with some embodiments.

FIG. 6 is a diagram illustrating an exemplary OTT content delivery system 600 that uses personalized keys for additional protection without following the standard DRM flows in accordance with some embodiments. In some embodiments, the exemplary system 600 includes an encoder and encryptor 610 coupled with an origin server 620 and a KSM 630. The encoder and encryptor 610 obtains keys and/or key identifiers (KIDs) from the KSM 630 in step 1 and produces encrypted content protected with the content key. The encoder and encryptor 610 then uploads the encrypted content to the origin server 620 and then to a CDN 605 using any pull/push approach for content upload in steps 2 and 3, respectively. The CDN 605 then stores the encrypted segments, e.g., storing encrypted segment 1, encrypted segment 2, . . . , encrypted segment N on the CDN 605.

When a legitimate user at a client device 660 requests the content from a CDN edge 607 in step 4, the client device 660 appends to the content request a personalized token that is unique and identifies the client. The CDN edge 607, after receiving the content request, parses the personalized token or sends a request to a control plane 650 for a personalized key and KID corresponding to the information in the personalized token in step 5. In step 6, the CDN edge 407 uses the personalized key and KID from the control plane 650 for encryption, including encrypting content initialization vector (IV), content or manifest metadata that are in clear (e.g., according to predefined patterns), and/or the encrypted content (e.g., double encryption of encrypted segment 1, encrypted segment 2, . . . , encrypted segment N), etc. As such, the CDN edge 607 provisions to the client device 660 the encrypted segments with encrypted metadata in accordance with some embodiments.

In step 8, the CDN edge 607 sends the provisioned encrypted content to the client device 660 along with encrypted metadata in the manifest. Once the client device 660 receives the encrypted content and the encrypted manifest, the client device 660 requests the license from the control plane 650 in step 9 and appends the personalized token to the request. In some embodiments, the control plane 650, upon receiving the license request, forwards the license request to a license server 640 in step 10. In response to receiving the license request, the license server 640 sends a request to the KSM 630 for keys in step 11, e.g., requesting both the content key and the personalized key. The KSM 630 retrieves the keys and the corresponding KIDs based on the information from the request and sends to the license server 640 in step 12. The license server 640 packages the keys in a license and returns the license to the client device 660 via the control plane 650 and signaled with different KIDs in compliance with any standard native DRM in steps 13 and 14, respectively.

In some embodiments, the client device 460 decrypts the content and/or the metadata using the content key and the personalized key in the license (or acquiring the keys through an additional secure pipeline) prior to content playback. In some embodiments, as will be described in further detail with reference to FIG. 7, the keys together with the content are injected into a security engine on the client device 660 for the processing and preparation of the content prior to content playback in the standard DRM pipeline.

In the exemplary system 600, in the case of the content key being compromised, it is not enough to share just the content key for decrypting the content, because some of the metadata is encrypted with personalized keys. The pirate would have to discover metadata decryption keys, patterns for decryption, decryption scheme, and/or key rotation schemes to decrypt the content.

Figure 7:
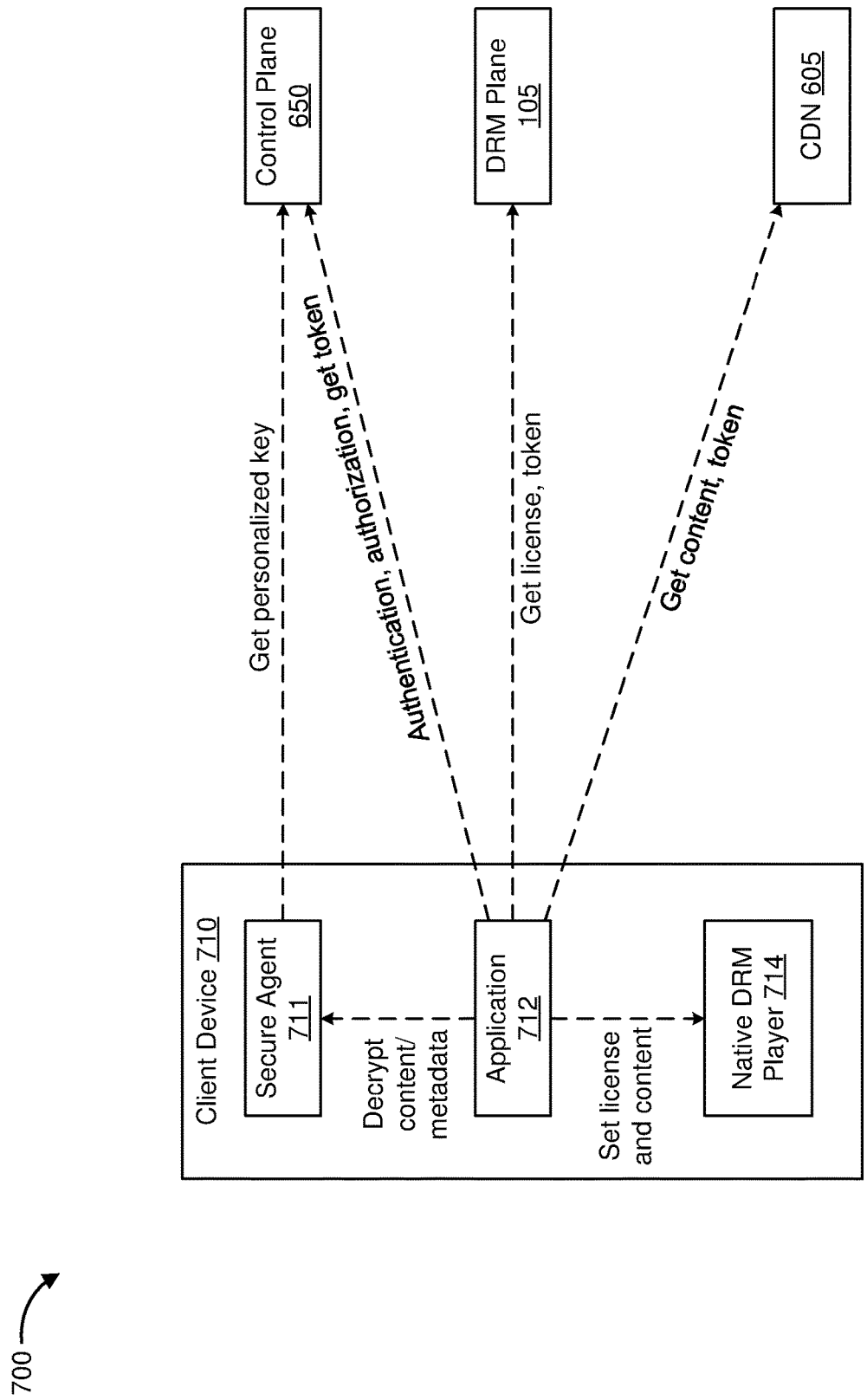
FIG. 7 is a diagram illustrating an exemplary client device used in the exemplary OTT content delivery system as shown in FIG. 6, in accordance with some embodiments.

FIG. 7 is a block diagram illustrating an exemplary client device 710 in an exemplary OTT content delivery system 700 in accordance with some embodiments. In some embodiments, the exemplary OTT content delivery system 700 includes the client device 710, the control plane 650 as described above with reference to FIG. 6, the DRM plane 105 as described above with reference to FIGS. 1A, 2-4, and 6, and the CDN 605 as described above with reference to FIG. 6. In some embodiments, the client device 710 corresponds to client device 2 102-2 (FIG. 1B) or the client device 660 (FIG. 6).

As shown in FIG. 7, similar to the client device 510 (FIG. 5), the client device 710 includes an application 712 coupled with a native DRM player 714 in accordance with some embodiments. The application 712 interacts with the control plane 650 to obtain authentication, authorization, and tokens, interacts with the DRM plane 105 to request DRM licenses and attach to the license request the personalized token obtained from the control plane 650, and interacts with the CDN 520 to request content and attach to the content request the personalized token obtained from the control plane 650. In addition to the application 712 and the native DRM player 714, the client device 710 includes a secure agent 711 for securely acquiring personalized keys from the control plane 650 to decrypt metadata and/or the double encrypted content and for providing the decrypted metadata and/or the encrypted content to the application 712 for processing according to the DRM pipeline, e.g., the application 712 instructing the native DRM player 714 to decrypt the content using the key(s) in the DRM license and render the decrypted content. As such, the client device 710 requires the secure agent 711 as the additional security component for content playback.

Figure 8A:
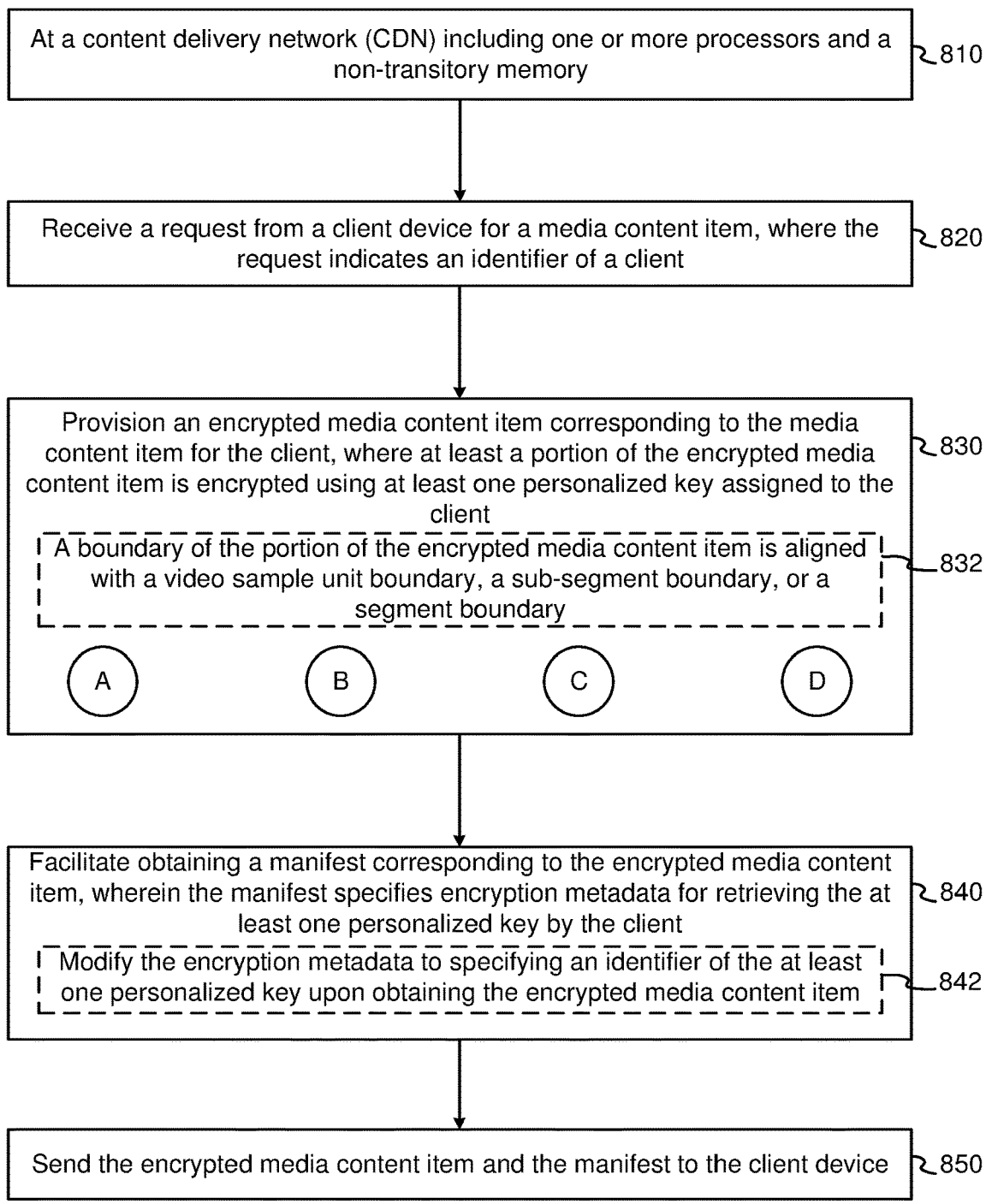

FIGS. 8A-8C are flow diagrams illustrating a method 800 for preventing rendering content from CDN to unauthorized users in accordance with some embodiments. As represented by block 810, in some embodiments, the method 800 is performed at a CDN that includes one or more processors and a non-transitory memory, e.g., the CDN 106B in FIGS. 1B, the CDN 205 in FIG. 2, the CDN 305 in FIG. 3, the CDN 405 in FIG. 4, the CDN 520 in FIG. 5, or the CDN 605 in FIGS. 6 and 7. The method 800 begins with the CDN receiving a request from a client device for a media content item, where the request indicates an identifier of a client as represented by block 820. For example, as shown in step 3 in FIG. 3 and step 4 in FIGS. 2, 4, and 6, the client device sends a content request and attaches to the content the personalized token, which has the identifier of the client, e.g., a session ID, a user ID, a device ID, etc.

The method 800 continues, as represented by block 830, with the CDN provisioning an encrypted media content item corresponding to the media content item for the client, where at least a portion of the encrypted media content item is encrypted using at least one personalized key assigned to the client. For example, in FIG. 1B, the CDN 106B provisions for both legitimate user 1 101-1 and legitimate user 2 101-2 in response to receiving the content requests by providing to client device 1 102-1 encrypted content that has at least a portion of the content encrypted with personalized key 1 and providing to client device 2 102-2 encrypted content that has at least a portion of the content encrypted with personalized key 2. In FIG. 2, the CDN 205 provisions for the legitimate user by providing to the client device 260 content key encrypted segments 1, N and N+2, K and an instance of personalized key encrypted segments. In FIG. 3, the CDN 305 provisions for the legitimate user by providing to the client device 360 JIT encrypted segments that are encrypted with the personalized key. In FIG. 4, the CDN 405 provisions for the legitimate user by providing to the client device 460 content key encrypted segments 1, N and N+2, N+m and personalized key encrypted segments N+1 and N+m+1 as well as the updated manifest in some embodiments. In FIG. 6, the CDN 605 provisions for the legitimate user by providing to the client device 660 the encrypted segments and encrypted metadata in the manifest or double encrypted content protected with the personalized key.

As represented by block 832, in some embodiments, during provisioning, a boundary of the portion of the encrypted media content item is aligned with a video sample unit boundary, a sub-segment boundary, or a segment boundary. For example, although FIGS. 2-4 and 5 illustrates storing segments and/or generating encrypted segments, the unit for encryption and/or storage can be a video sample (or a partial video sample), a sub-segment (e.g., for low latency streaming), or a segment. As will be shown and described with reference to FIGS. 8B and 8C, the provisioning by the CDN has various embodiments.

The method 800 continues, as represented by block 840, with the CDN facilitating obtaining a manifest corresponding to the encrypted media content item, wherein the manifest specifies encryption metadata for retrieving the at least one personalized key by the client. In some embodiments, as represented by block 842, facilitating obtaining the manifest corresponding to the encrypted media content item includes modifying the encryption metadata to specifying an identifier of the at least one personalized key upon obtaining the encrypted media content item. Further, as represented by block 850, the method 500 continues with the CDN sending the encrypted media content item and the manifest to the client device. For example, in FIG. 2, the CDN 205 facilitates obtaining the manifest and sends the manifest to the client device 260. In another example, in FIGS. 3 and 4, the CDN edge 307 or the CDN edge 407 encrypts certain segments with the personalized key and updates the manifest (e.g., specifying in the manifest the KID associated with the personalized key) before sending the encrypted segments along with the updated manifest to the client device 360 and 460, respectively. Likewise, in FIG. 6, the CDN edge 607 encrypts segments and/or the metadata in the manifest with the personalized key and sends the encrypted segments and the manifest with the encrypted metadata and the KID to the client device 660.

Turning to FIG. 8B, as represented by block 860, in some embodiments, the portion of the encrypted media content item includes an instance of an encrypted segment encrypted with the at least one personalized key. In such embodiments, provisioning the encrypted media content item corresponding to the media content item for the client includes: (a) deriving an instance identifier from the identifier of the client; and (b) selecting the instance of the encrypted segment from multiple instances of the encrypted segment based on the instance identifier, where each of the multiple instances is encrypted using a different personalized key. For example, in FIG. 2, the CDN 205 stores M instances of segment N+1, each of the M instances is a variant of segment N+1 encrypted with a different personalized key. Further as shown in FIG. 2, the CDN 205 receives the content request with the personalized token attached in step 4. Also shown in FIG. 2, in step 5, the CDN 205 selects from the M instances of segment N+1 one instance that is encrypted with the personalized key corresponding to the identifier of the client embedded in the personalized token.

As represented by block 862, in some embodiments, the encrypted media content item includes encrypted segments protected with a content key corresponding to the media content item. In such embodiments, the method 800 further includes: (a) receiving the encrypted segments and the multiple instances of the encrypted segment from a headend; and (b) storing the encrypted segments and the multiple instances of the encrypted segment in accordance with some embodiments. For example, in FIG. 2, the encoder and encryptor 210 generates the partially multiplied encrypted content, where some segments of the media content item are encrypted with the content key corresponding to the media content item, e.g., segments 1, N and N+2, K, and each of the other segments of the media content item, e.g., segment N+1, has multiple instances of variant encrypted with different personalized keys. Upon generating the partially multiplied encrypted content, the encoder and encryptor 210 uploads to the origin server 220 in the headend in step 2. In step 3 shown in FIG. 3, the origin server 220 then sends the partially multiplied encrypted content to the CDN 205 for storage.

As represented by block 864, in some embodiments, the encrypted segments are generated by the headend during a global content encryption period using the content key, and the multiple instances of the encrypted segment are generated by the headend during a personalized content preparation period using multiple personalized keys. As such, the encrypted segments are interleaved with the instance of the encrypted segment in the encrypted media content item. For example, in FIG. 2, the media content item includes a plurality of segments, e.g., segment 1 through segment K. When the encoder and encryptor 210 prepares the partially multiplied encrypted content, the encoder and encryptor 210 first encrypts segment 1 through segment N using the content key assigned by the KSM 230 to the media content item during a global content encryption period. During a subsequent personalized content preparation period, the encoder and encryptor 210 generates multiple instances of segment N+1 using multiple personalized keys from the KSM 230. During provisioning, the CDN 205 provides to the client device 260 the interleaved encrypted segments, e.g., segments 1, . . . , N encrypted with the content key followed by an instance of segment N+1 encrypted with the personalized key and then followed by segments N+2, . . . , K encrypted with the content key.

Still referring to FIG. 8B, as represented by block 870, in some embodiments, the portion of the encrypted media content item corresponds to the encrypted media content item. In such embodiments, provisioning the encrypted media content item corresponding to the media content item for the client includes: (a) receiving the media content item in an unencrypted format from a headend; and (b) obtaining the at least one personalized key corresponding to the identifier of the client and encrypting the media content item using the at least one personalized key to generate the encrypted media content item in response to receiving the request from the client. For example, in FIG. 3, the CDN 305 receives the clear content from the origin server 320 in step 2. In response to receiving the content request attached with the personalized token in step 3, The CDN edge 307 performs JIT encryption of the clear content using the personalized key corresponding to the personalized token in step 6. As such, the entire media content item is protected with the personalized key.

Turning to FIG. 8C, as represented by block 880, in some embodiments, the encrypted media content item includes the portion of the encrypted media content protected with the at least one personalized key and encrypted segments protected with a content key corresponding to the media content item. In such embodiments, provisioning the encrypted media content item corresponding to the media content item for the client includes: (a) receiving the encrypted segments and an unencrypted portion of the media content item from a headend, wherein the encrypted segments and the unencrypted portion are interleaved; and (b) obtaining the at least one personalized key corresponding to the identifier of the client and encrypting the unencrypted portion using the at least one personalized key to generate the portion of the encrypted media content item in response to receiving the request from the client. For example, in FIG. 4, the encoder and encryptor 410 partially encrypts the media content item using a content key while leaving another portion in clear, e.g., alternating encrypting segments 1, N and not encrypting segment N+1 and then encrypting segments N+2, . . . , N+m followed by not encrypting segment N+m+1, etc. The partially clear content is then sent to the CDN 405 in steps 2 and 3. When the CDN edge 407 receives the content request attached with the personalized token from the client device 460 in step 4, the CDN edge 407 obtains the personalized key corresponding to the identifier of the client embedded in the personalized token, and encrypts the clear portion using the personalized key, e.g., encrypting segment N+1 and segment N+m+1. As such, the encrypted media content item sent to the client device 460 in step 8 includes the encrypted segments protected with the content key interleaved with the portion encrypted using the personalized key.

Still referring to FIG. 8C, in some embodiments, as represented by block 890, provisioning the encrypted media content item corresponding to the media content item for the client includes: (a) receiving encrypted segments protected with a content key corresponding to the media content item from a headend; and (b) modifying at least one of the encrypted segments or the encryption metadata associated with the content key in response to receiving the request from the client. As such, the CDN modifies the content such that the modified content would not be playable in the form being delivered to the client, e g, manipulated in any way that a legitimate client, after receiving personalized data from the CDN, would be able to recover the original data but a pirate would not be able to derive the original data. In some embodiments, the modification includes applying a function to the encrypted segment and/or changing the parameter(s) to the metadata, etc.

In some embodiments, as represented by block 892, modifying at least one of the encrypted segments or the encryption metadata associated with the content key in response to receiving the request from the client includes: (a) obtaining the at least one personalized key corresponding to the identifier of the client; and (b) encrypting, using the at least one personalized key, at least one of the encrypted segments or the encryption metadata associated with the content key in response to receiving the request from the client. For example, in FIG. 6, the CDN 605 receives the encrypted content from the origin server 620 in step 3. The encrypted content is generated by the encoder and encryptor 610 using the content key from the KSM 630. In response to receiving the content request with the personalized token attached from the client device 660 in step 4, the CDN edge 607 obtains the personalized key corresponding to the personalized token and uses the personalized key to encrypt the encrypted segments 1, . . . , N and/or the encryption metadata in the manifest. As such, a pirate without the secure agent 711 (FIG. 7) on the client device would not be able to play the double encrypted segments and/or the encrypted metadata. On the other hand, as represented by block 894, in some embodiments, sending the encrypted media content item and the manifest to the client device causes the client device to derive the encrypted segments and the encryption metadata, including decrypting the encrypted segments or the encryption metadata associated with the content key using the at least one personalized key. As such, as shown in FIG. 7, a legitimate client with the secure agent 711 on the client device would be able to obtain the personalized key from the control plane 650 and obtain the data prior to the modification for the application 712.

Figure 9:
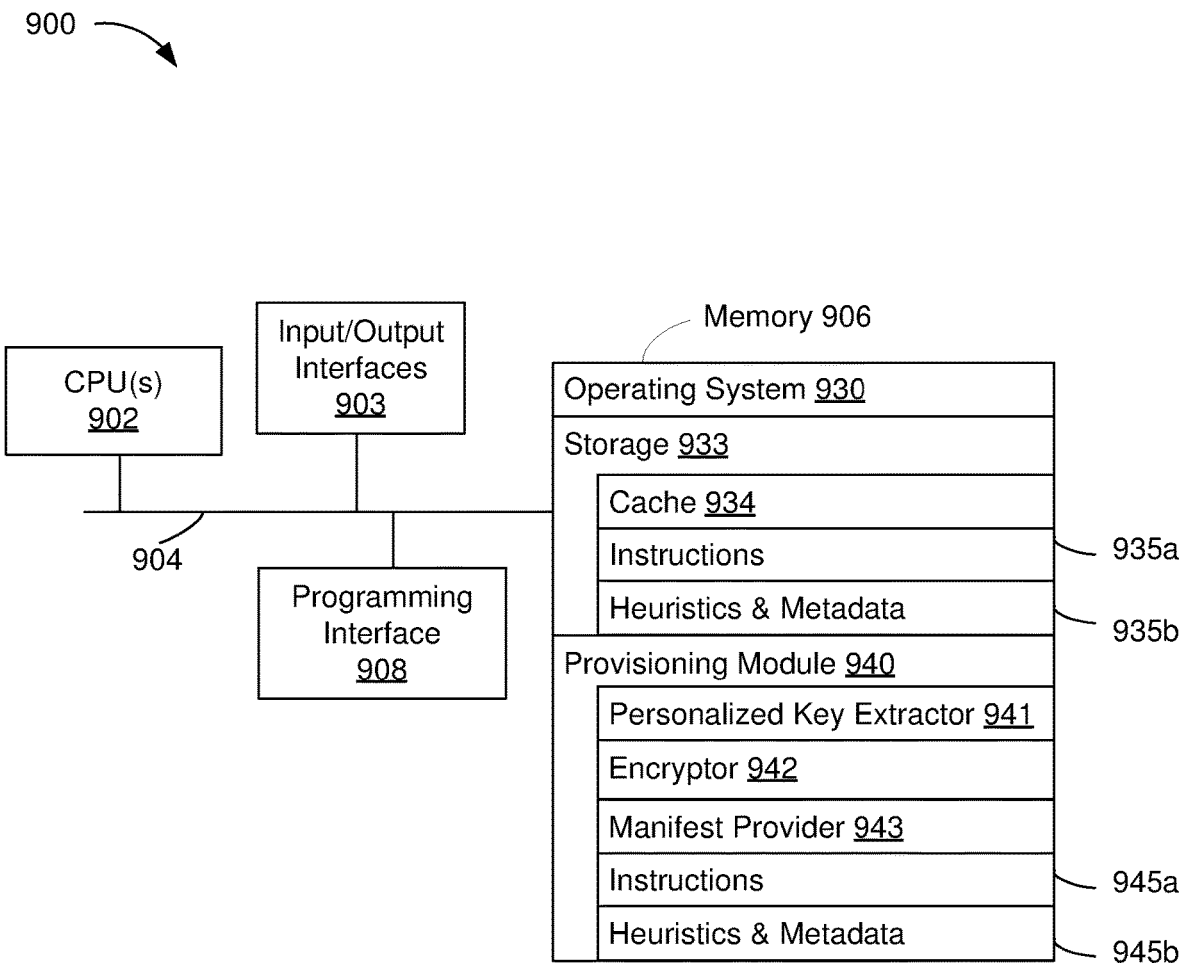
FIG. 9 is a block diagram of a computing device for preventing rendering content from CDN to unauthorized users, in accordance with some embodiments.

FIG. 9 is a block diagram of a computing device 900 for preventing rendering content from CDN to unauthorized users in accordance with some embodiments. In some embodiments, the computing device 900 performs one or more functions of the CDN 106B (FIG. 1B), the CDN 205 (FIG. 2), the CDN 305 (FIG. 3), the CDN 405 (FIG. 4), the CDN 520 (FIG. 5), or the CDN 605 (FIGS. 6 and 7) and performs one or more of the functionalities described above with respect to the CDN. Specifically, in some embodiments, the computer device 900 performs one or more functions of the CDN edge 307 (FIG. 3), the CDN edge 407 (FIG. 4) or the CDN edge 607 (FIG. 6). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPUs) 902 (e.g., processors), one or more input/output interfaces 903 (e.g., input devices, sensors, a network interface, a display, etc.), a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930, a storage module 933, and a provisioning module 940. In some embodiments, one or more instructions are included in a combination of logic and non-transitory memory. The operating system 930 includes procedures for handling various basic system services and for performing hardware dependent tasks.

In some embodiments, the storage module 933 further includes a cache 934 for storing the clear or encrypted media content item, e.g., for storing the partially multiplied encrypted content in FIG. 2, for storing the clear content in FIG. 3, for storing the partially clear content in FIG. 4, and/or for storing the encrypted content in FIG. 6. To that end, the content storage module 933 includes a set of instructions 935a and heuristics and metadata 935b.

In some embodiments, the provisioning module 940 is configured to provision for a client encrypted media content item and/or facilitate obtaining the manifest for playing the media content item, where at least a portion of the encrypted media content item is protected with a personalized key. In some embodiments, the provisioning module 940 further includes a personalized key extractor 941 for obtaining a personalized key corresponding to a personalized token from the client, an encryptor 942 for using the personalized key to encrypt at least a portion of the media content item, and a manifest provider 943 for updating encryption metadata in the manifest. To that end, the provisioning module 940 includes a set of instructions 945a and heuristics and metadata 945b.

Although the storage module 933 and the provisioning module 940 are illustrated as residing on a single computing device 900, it should be understood that in other embodiments, any combination of the storage module 933 and the provisioning module 940 can reside in separate computing devices in various embodiments. For example, in some embodiments, each of the storage module 933 and the provisioning module 940 resides on a separate computing device.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a content delivery network (CDN) including one or more processors and a non-transitory memory:
receiving a request from a client device for a media content item, wherein the request indicates an identifier of a client;
provisioning an encrypted media content item corresponding to the media content item for the client, wherein at least a portion of the encrypted media content item is encrypted using at least one personalized key assigned to the client;
facilitating obtaining a manifest corresponding to the encrypted media content item, wherein the manifest specifies encryption metadata for retrieving the at least one personalized key by the client;
sending the encrypted media content item and the manifest to the client device; and
wherein a boundary of the portion of the encrypted media content item is aligned with a video sample unit boundary, a sub-segment boundary, or a segment boundary.

2. The method of claim 1, wherein:
the portion of the encrypted media content item includes an instance of an encrypted segment encrypted with the at least one personalized key; and
provisioning the encrypted media content item corresponding to the media content item for the client includes:
deriving an instance identifier from the identifier of the client; and
selecting the instance of the encrypted segment from multiple instances of the encrypted segment based on the instance identifier, wherein each of the multiple instances is encrypted using a different personalized key.

3. The method of claim 2, wherein the encrypted media content item includes encrypted segments protected with a content key corresponding to the media content item, and the method further includes:
receiving the encrypted segments and the multiple instances of the encrypted segment from a headend; and
storing the encrypted segments and the multiple instances of the encrypted segment.

4. The method of claim 3, wherein:
the encrypted segments are generated by the headend during a global content encryption period using the content key;
the multiple instances of the encrypted segment are generated by the headend during a personalized content preparation period using multiple personalized keys; and
the encrypted segments are interleaved with the instance of the encrypted segment in the encrypted media content item.

5. The method of claim 1, wherein:
the portion of the encrypted media content item corresponds to the encrypted media content item; and
provisioning the encrypted media content item corresponding to the media content item for the client includes:

receiving the media content item in an unencrypted format from a headend; and obtaining the at least one personalized key corresponding to the identifier of the client and encrypting the media content item using the at least one personalized key to generate the encrypted media content item in response to receiving the request from the client.

6. The method of claim 1, wherein:

the encrypted media content item includes the portion of the encrypted media content protected with the at least one personalized key and encrypted segments protected with a content key corresponding to the media content item; and provisioning the encrypted media content item corresponding to the media content item for the client includes:

receiving the encrypted segments and an unencrypted portion of the media content item from a headend, wherein the encrypted segments and the unencrypted portion are interleaved; and obtaining the at least one personalized key corresponding to the identifier of the client and encrypting the unencrypted portion using the at least one personalized key to generate the portion of the encrypted media content item in response to receiving the request from the client.

7. The method of claim 1, wherein provisioning the encrypted media content item corresponding to the media content item for the client includes:

receiving encrypted segments protected with a content key corresponding to the media content item from a headend; and modifying at least one of the encrypted segments or the encryption metadata associated with the content key in response to receiving the request from the client.

8. The method of claim 7, wherein modifying at least one of the encrypted segments or the encryption metadata associated with the content key in response to receiving the request from the client includes:

obtaining the at least one personalized key corresponding to the identifier of the client; and encrypting, using the at least one personalized key, at least one of the encrypted segments or the encryption metadata associated with the content key in response to receiving the request from the client.

9. The method of claim 7, wherein sending the encrypted media content item and the manifest to the client device causes the client device to:

derive the encrypted segments and the encryption metadata, including decrypting the encrypted segments or the encryption metadata associated with the content key using the at least one personalized key.

10. The method of claim 1, wherein facilitating obtaining the manifest corresponding to the encrypted media content item includes:

modifying the encryption metadata to specifying an identifier of the at least one personalized key upon obtaining the encrypted media content item.

11. A device comprising:
one or more processors;
a non-transitory memory; and
one or more programs stored in the non-transitory memory, which, when executed by the one or more processors, cause the device to:

receive a request from a client device for a media content item, wherein the request indicates an identifier of a client;

provision an encrypted media content item corresponding to the media content item for the client, wherein at least a portion of the encrypted media content item is encrypted using at least one personalized key assigned to the client;

facilitate obtaining a manifest corresponding to the encrypted media content item, wherein the manifest specifies encryption metadata for retrieving the at least one personalized key by the client;

send the encrypted media content item and the manifest to the client device; and wherein a boundary of the portion of the encrypted media content item is aligned with a video sample unit boundary, a sub-segment boundary, or a segment boundary.

12. The device of claim 11, wherein:

the portion of the encrypted media content item includes an instance of an encrypted segment encrypted with the at least one personalized key; and provisioning the encrypted media content item corresponding to the media content item for the client includes:

deriving an instance identifier from the identifier of the client; and selecting the instance of the encrypted segment from multiple instances of the encrypted segment based on the instance identifier, wherein each of the multiple instances is encrypted using a different personalized key.

13. The device of claim 12, wherein the encrypted media content item includes encrypted segments protected with a content key corresponding to the media content item, and the one or more programs further cause the device to:

receive the encrypted segments and the multiple instances of the encrypted segment from a headend; and store the encrypted segments and the multiple instances of the encrypted segment.

14. The device of claim 13, wherein:

the encrypted segments are generated by the headend during a global content encryption period using the content key;

the multiple instances of the encrypted segment are generated by the headend during a personalized content preparation period using multiple personalized keys; and the encrypted segments are interleaved with the instance of the encrypted segment in the encrypted media content item.

15. The device of claim 11, wherein:

the portion of the encrypted media content item corresponds to the encrypted media content item; and provisioning the encrypted media content item corresponding to the media content item for the client includes:

receiving the media content item in an unencrypted format from a headend; and obtaining the at least one personalized key corresponding to the identifier of the client and encrypting the media content item using the at least one personalized key to generate the encrypted media content item in response to receiving the request from the client.

16. The device of claim 11, wherein:

the encrypted media content item includes the portion of the encrypted media content protected with the at least one personalized key and encrypted segments protected with a content key corresponding to the media content item; and provisioning the encrypted media content item corresponding to the media content item for the client includes:

receiving the encrypted segments and an unencrypted portion of the media content item from a headend, wherein the encrypted segments and the unencrypted portion are interleaved; and obtaining the at least one personalized key corresponding to the identifier of the client and encrypting the unencrypted portion using the at least one personalized key to generate the portion of the encrypted media content item in response to receiving the request from the client.

17. The device of claim 11, wherein provisioning the encrypted media content item corresponding to the media content item for the client includes:

receiving encrypted segments protected with a content key corresponding to the media content item from a headend; and modifying at least one of the encrypted segments or the encryption metadata associated with the content key in response to receiving the request from the client.

18. The device of claim 17, wherein modifying at least one of the encrypted segments or the encryption metadata associated with the content key in response to receiving the request from the client includes:

obtaining the at least one personalized key corresponding to the identifier of the client; and encrypting, using the at least one personalized key, at least one of the encrypted segments or the encryption metadata associated with the content key in response to receiving the request from the client.

19. A non-transitory memory storing one or more programs, which, when executed by one or more processors of a device, cause the device to:

receive a request from a client device for a media content item, wherein the request indicates an identifier of a client;

provision an encrypted media content item corresponding to the media content item for the client, wherein at least a portion of the encrypted media content item is encrypted using at least one personalized key assigned to the client;

facilitate obtaining a manifest corresponding to the encrypted media content item, wherein the manifest specifies encryption metadata for retrieving the at least one personalized key by the client;

send the encrypted media content item and the manifest to the client device; and wherein a boundary of the portion of the encrypted media content item is aligned with a video sample unit boundary, a sub-segment boundary, or a segment boundary.

* * * * *